(12) United States Patent
Tsuzuki

(10) Patent No.: US 9,183,634 B2
(45) Date of Patent: Nov. 10, 2015

(54) IMAGE PROCESSING APPARATUS AND IMAGE PROCESSING METHOD

(71) Applicant: OLYMPUS CORPORATION, Tokyo (JP)

(72) Inventor: Toshihiro Tsuzuki, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/574,698

(22) Filed: Dec. 18, 2014

(65) Prior Publication Data

US 2015/0104097 A1    Apr. 16, 2015

Related U.S. Application Data

(63) Continuation of application No. PCT/JP2013/053106, filed on Feb. 8, 2013.

(30) Foreign Application Priority Data

Jun. 27, 2012 (JP) ................................ 2012-144598

(51) Int. Cl.
  *G06K 9/00* (2006.01)
  *G06T 7/00* (2006.01)
  *G06T 7/20* (2006.01)

(52) U.S. Cl.
  CPC .............. *G06T 7/0051* (2013.01); *G06T 7/002* (2013.01); *G06T 7/20* (2013.01); *G06T 2207/10012* (2013.01)

(58) Field of Classification Search
  None
  See application file for complete search history.

(56) References Cited

U.S. PATENT DOCUMENTS

2008/0137940 A1*  6/2008  Kakinami et al. ............ 382/154

FOREIGN PATENT DOCUMENTS

| JP | 2006-234492 | * | 9/2006 | ............. G01B 11/00 |
| JP | 2006-234492 | A | 9/2006 | |
| JP | 2007-256029 | * | 10/2007 | ............. G01B 11/00 |
| JP | 2007-256029 | A | 10/2007 | |

OTHER PUBLICATIONS

Migital et al ("One Dimensional Epipole Search based on Point Correspondences in Two Uncalibrated Views", IPSJ SIG Notes (Mar. 17, 2006), vol. 2006, No. 25, pp. 413-420), (English Abstract provided by Applicant).*

(Continued)

*Primary Examiner* — Amara Abdi
(74) *Attorney, Agent, or Firm* — Scully, Scott, Murphy & Presser, PC

(57) ABSTRACT

An image processing apparatus includes an image acquisition unit acquiring a plurality of images, a corresponding point acquisition unit, a first fundamental matrix estimation unit, an epipole coordinate deriving unit, an epipole coordinate determination unit, and a fundamental matrix determination unit. The corresponding point acquisition unit acquires first corresponding points. The first fundamental matrix estimation unit calculates first fundamental matrices based on the first corresponding points. The epipole coordinate deriving unit calculates first epipole coordinates that correspond to the first fundamental matrices. The epipole coordinate determination unit determines one of the first epipole coordinates as a second epipole coordinate. The fundamental matrix determination unit determines the first fundamental matrix corresponding to the second epipole coordinate as a second fundamental matrix.

8 Claims, 11 Drawing Sheets

(56) References Cited

OTHER PUBLICATIONS

International Search Report dated Apr. 9, 2013 issued in PCT/2013/053106.

Migita, Tsuyoshi et al., "One Dimensional Epipole Search based on Point Correspondences in Two Uncalibrated Views", IPSJ SIG Notes (Mar. 17, 2006), vol. 2006, No. 25, pp. 413-420, with English Abstract.

International Preliminary Report on Patentability together with the Written Opinion from related International Application No. PCT/JP2013/053106 dated Jan. 8, 2015, together with an English language translation.

* cited by examiner

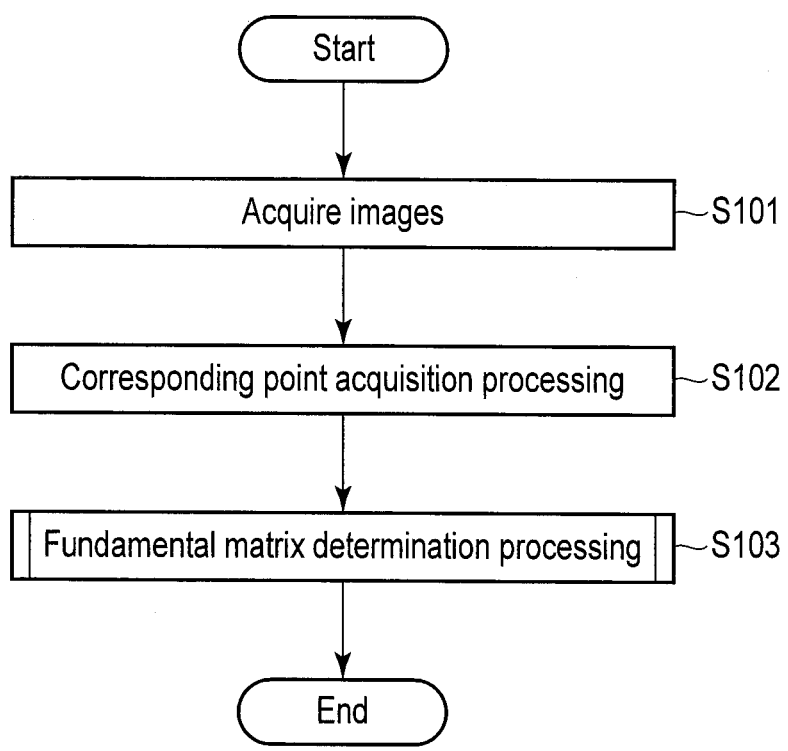
F I G. 2

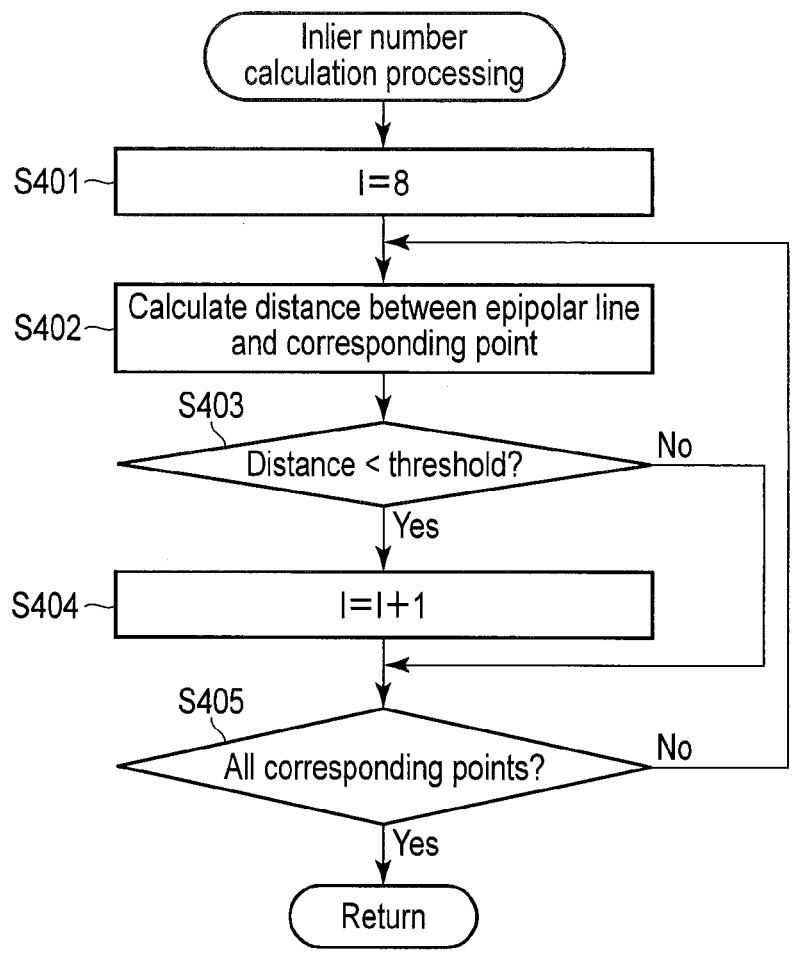
F I G. 6
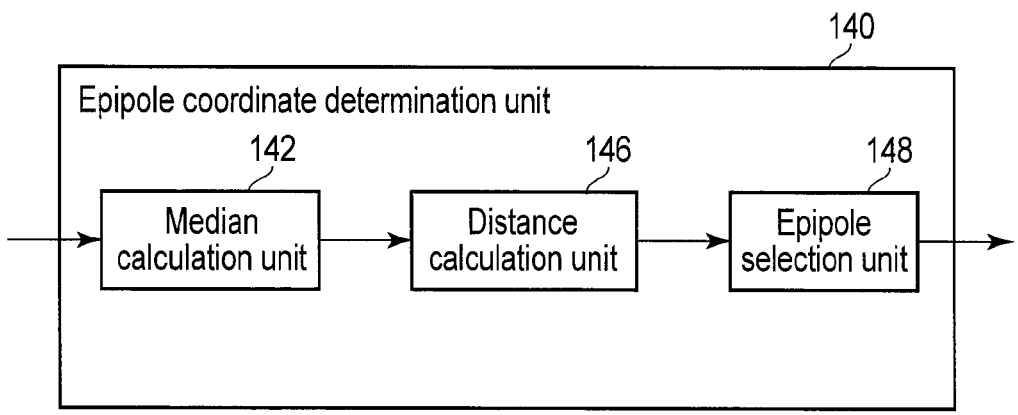
F I G. 7

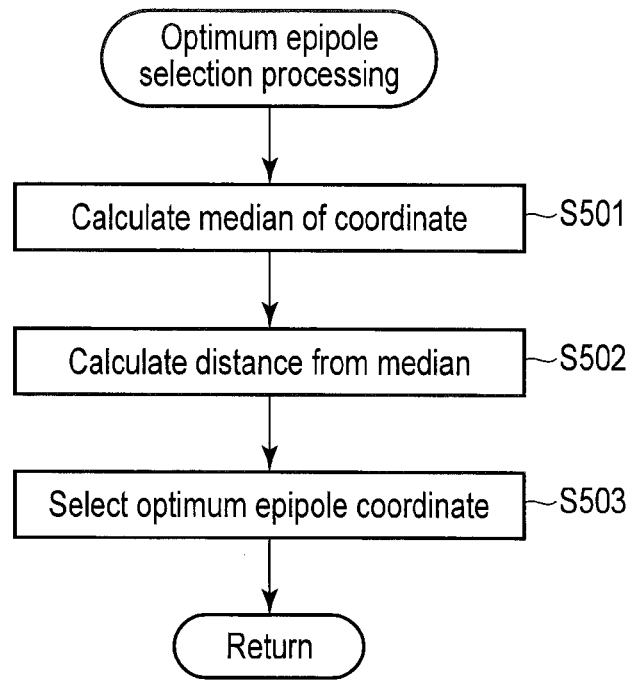
F I G. 8
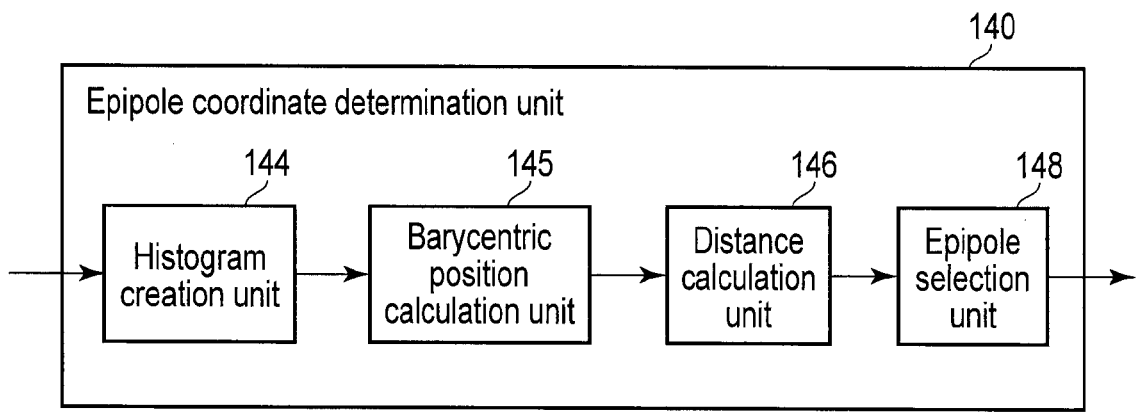
F I G. 9

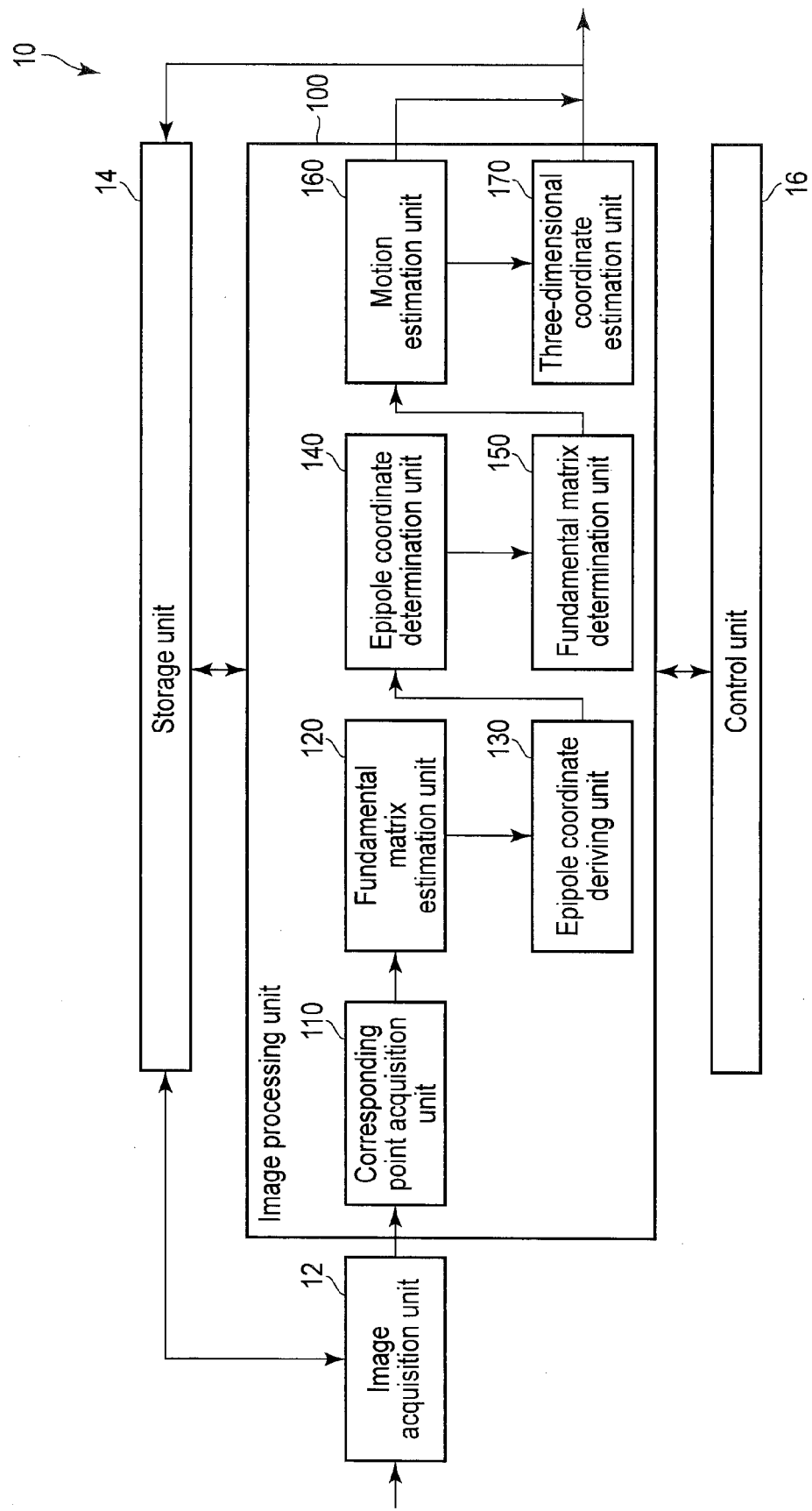
F I G. 12

IMAGE PROCESSING APPARATUS AND IMAGE PROCESSING METHOD

CROSS-REFERENCE TO RELATED APPLICATIONS

This application is a Continuation Application of PCT Application No. PCT/JP2013/053106, filed Feb. 8, 2013 and based upon and claiming the benefit of priority from prior Japanese Patent Application No. 2012-144598, filed Jun. 27, 2012, the entire contents of all of which are incorporated herein by reference.

BACKGROUND OF THE INVENTION

1. Field of the Invention

The present invention relates to an image processing apparatus and an image processing method.

2. Description of the Related Art

In general, there has been known a technique for estimating, on the basis of two images, changes in the position and attitude of a camera which has taken those images. According to this technique, a plurality of points that are determined to be shown in both of the two images are extracted, the correspondence between these points is acquired, and the points are then specified as corresponding points. A fundamental matrix is calculated on the basis of the corresponding points, and changes in the position and attitude of the camera are estimated on the basis of the fundamental matrix. The use of a robust estimation technique such as random sample consensus (RANSAC) for the calculation of the fundamental matrix has been disclosed in, for example, Jpn. Pat. Appln. KOKAI Publication No. 2007-256029. In RANSAC, eight corresponding points are extracted at random from among a large number of corresponding points, and temporary fundamental matrices are calculated. For example, the distance from an epipolar line is used as an index to evaluate each of the temporary fundamental matrices, so that particular errors of the corresponding points and the influence of a dynamic subject included in images are excluded. Jpn. Pat. Appln. KOKAI Publication No. 2007-256029 has also disclosed a technique for repeating the process from the calculation of the fundamental matrix to the estimation of changes in the position and attitude of the camera and thereby determines most probable changes in the position and attitude.

BRIEF SUMMARY OF THE INVENTION

According to an aspect of the present invention, an image processing apparatus includes: an image acquisition unit configured to acquire a plurality of images; a corresponding point acquisition unit configured to acquire a plurality of first corresponding points that correspond to each other between the images; a first fundamental matrix estimation unit configured to calculate a plurality of first fundamental matrices based on the first corresponding points; an epipole coordinate deriving unit configured to calculate, for at least one image, a plurality of first epipole coordinates that respectively correspond to the first fundamental matrices; an epipole coordinate determination unit configured to determine one of the first epipole coordinates as a second epipole coordinate by using a predetermined statistical technique; and a fundamental matrix determination unit configured to determine the first fundamental matrix corresponding to the second epipole coordinate as a second fundamental matrix.

According to another aspect of the present invention, an imaging device includes: an imaging unit configured to form images; an image acquisition unit configured to acquire the images formed at different time; a corresponding point acquisition unit configured to acquire a plurality of first corresponding points that correspond to each other between the images; a first fundamental matrix estimation unit configured to calculate a plurality of first fundamental matrices based on the first corresponding points; an epipole coordinate deriving unit configured to calculate, for at least one image, a plurality of first epipole coordinates that respectively correspond to the first fundamental matrices; an epipole coordinate determination unit configured to determine one of the first epipole coordinates as a second epipole coordinate by using a predetermined statistical technique; a fundamental matrix determination unit configured to determine the first fundamental matrix corresponding to the second epipole coordinate as a second fundamental matrix; and a correction unit configured to correct a shake between the images based on the second fundamental matrix.

According to another aspect of the present invention, an image processing method includes: acquiring a plurality of images; acquiring a plurality of first corresponding points that correspond to each other between the images; calculating a plurality of first fundamental matrices based on the first corresponding points; calculating, for at least one image, a plurality of first epipole coordinates that respectively correspond to the first fundamental matrices; determining one of the first epipole coordinates as a second epipole coordinate by using a predetermined statistical technique; and determining the first fundamental matrix corresponding to the second epipole coordinate as a second fundamental matrix.

According to another aspect of the present invention, a non-transitory computer-readable storage medium records a program which causes a computer to: acquire a plurality of images; acquire a plurality of first corresponding points that correspond to each other between the images; calculate a plurality of first fundamental matrices based on the first corresponding points; calculate, for at least one image, a plurality of first epipole coordinates that respectively correspond to the first fundamental matrices; determine one of the first epipole coordinates as a second epipole coordinate by using a predetermined statistical technique; and determine the first fundamental matrix corresponding to the second epipole coordinate as a second fundamental matrix.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart showing an example of processing by the image processing apparatus according to the first embodiment;

FIG. 6 is a flowchart showing an example of inlier number calculation processing according to the first embodiment;

FIG. 7 is a block diagram showing a configuration example of an epipole coordinate determination unit according to the first embodiment;

FIG. 8 is a flowchart showing an example of optimum epipole selection processing according to the first embodiment;

FIG. 9 is a block diagram showing a configuration example of an epipole coordinate determination unit according to a second embodiment;

FIG. 12 is a block diagram showing a configuration example of an image processing apparatus according to a third embodiment;

DETAILED DESCRIPTION OF THE INVENTION

First Embodiment

Figure 1:
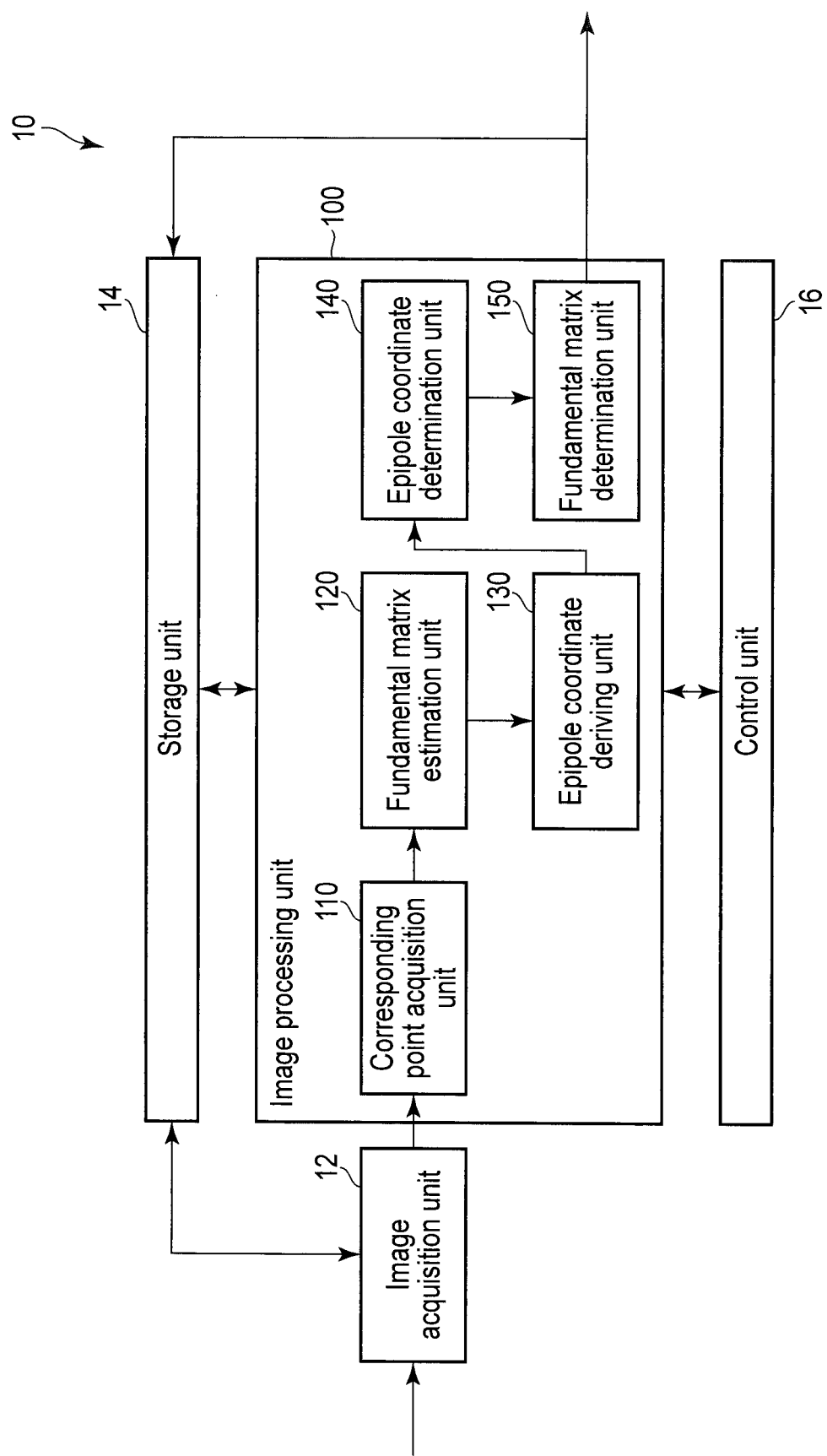
FIG. 1 is a block diagram showing a configuration example of an image processing apparatus according to a first embodiment.

A first embodiment of the present invention is described with reference to the drawings. A configuration example of an image processing apparatus 10 according to the present embodiment is shown in FIG. 1. As shown in FIG. 1, the image processing apparatus 10 comprises an image processing unit 100, an image acquisition unit 12, a storage unit 14, and a control unit 16. The image processing apparatus 10 calculates and outputs a fundamental matrix which represents the relation between input images.

The image processing unit 100 plays the central role in the image processing apparatus 10, and calculates the fundamental matrix regarding the input images as will be described later. The image acquisition unit 12 acquires data on the image to be processed from the outside of the image processing apparatus 10 or from the storage unit 14, and inputs the data to the image processing unit 100. The image data to be processed, programs associated with various computations, and computation results are stored in the storage unit 14. The control unit 16 controls the operation of the image processing apparatus 10.

The image processing unit 100 has a corresponding point acquisition unit 110, a fundamental matrix estimation unit 120, an epipole coordinate deriving unit 130, an epipole coordinate determination unit 140, and a fundamental matrix determination unit 150. The corresponding point acquisition unit 110 extracts common points included in the images input from the image acquisition unit 12, and acquires the correspondence of the points between the images. The corresponding point acquisition unit 110 outputs, as corresponding points, the points from which the correspondence has been obtained. On the basis of the corresponding points acquired by the corresponding point acquisition unit 110, the fundamental matrix estimation unit 120 calculates first fundamental matrices which are fundamental matrices representing the relation between the images, by using a robust technique such as random sample consensus (RANSAC).

On the basis of each of the first fundamental matrices calculated by the fundamental matrix estimation unit 120, the epipole coordinate deriving unit 130 calculates coordinates of epipoles between the images corresponding to the fundamental matrices. The epipole coordinate determination unit 140 selects the most probable epipole from the coordinates of the epipoles calculated by the epipole coordinate deriving unit 130. The fundamental matrix determination unit 150 regards, as an optimum fundamental matrix, the first fundamental matrix corresponding to the epipole selected by the epipole coordinate determination unit 140, and thus determines a second fundamental matrix.

The operation of the image processing apparatus 10 according to the present embodiment is described with reference to a flowchart shown in FIG. 2. In step S101, the image acquisition unit 12 acquires, for example, two images targeted for image processing by the image processing apparatus 10. The image acquisition unit 12 may acquire images from the outside of the image processing apparatus 10 or may acquire images stored in the storage unit 14. The acquired images are input to the image processing unit 100.

In step S102, the corresponding point acquisition unit 110 in the image processing unit 100 performs processing to acquire corresponding points between images. That is, the corresponding point acquisition unit 110 acquires the positional relation between the corresponding points in the two images input from the image acquisition unit 12. This corresponding point acquisition processing may be feature-based matching such as feature point tracking, or an area-based matching such as block matching. Here, the points for which the correspondence is obtained by the corresponding point acquisition unit 110 are referred to as corresponding points. Generally, several thousand corresponding points are obtained by the corresponding point acquisition processing.

In step S103, the image processing unit 100 performs fundamental matrix determination processing on the basis of the corresponding points acquired by the corresponding point acquisition unit 110. The fundamental matrix determination processing is described with reference to a flowchart shown in FIG. 3. In step S201 to step S204, the image processing unit 100 repeatedly calculates described-later fundamental matrices and epipole coordinates N times, which is a predetermined number of times, on the basis of epipolar geometry. That is, the image processing unit 100 calculates N combinations of fundamental matrices and epipole coordinates.

Figure 4:
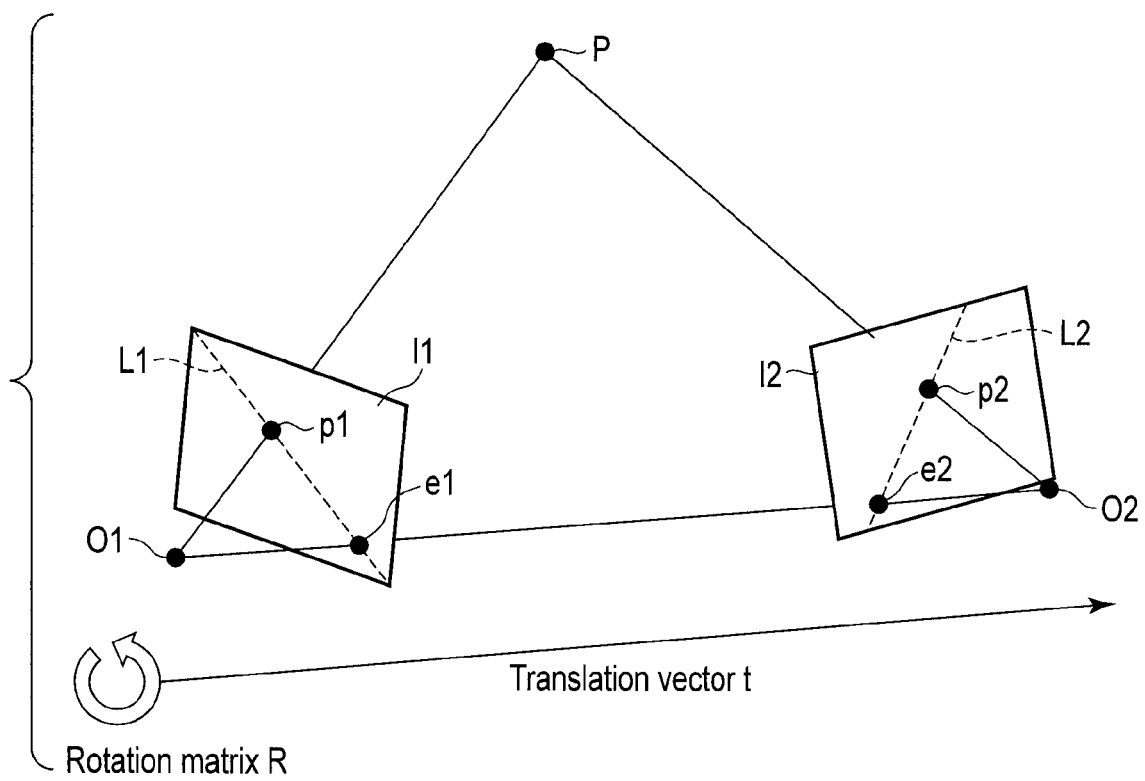
FIG. 4 is a diagram illustrating an epipolar geometry.

Here, epipolar geometry is briefly described with reference to FIG. 4. A pinhole camera model in which a camera is assumed to be a pinhole camera is described below. Suppose that a stationary point P in space is photographed by a first camera having a first lens principal point O1 and a second camera having a second lens principal point O2. Suppose that coordinates are obtained on a first image plane I1 by the first camera and on a second image plane I2 by the second camera. A coordinate of the point where the point P is imaged on the first image plane I1 is a coordinate p1. An x-coordinate and a y-coordinate of the coordinate p1 are image coordinates (u1, v1). A coordinate of the point where the point P is imaged on the second image plane I2 is a coordinate p2. An x-coordinate and a y-coordinate of the coordinate p2 are image coordinates (u2, v2).

The intersection of a straight line connecting the first lens principal point O1 and the second lens principal point O2 and the first image plane I1 is referred to as a first epipole e1. The intersection of the straight line and the second image plane I2 is referred to as a second epipole e2. The intersection line of a plane including the point P, the first lens principal point O1 and the second lens principal point O2, and the first image plane I1 is referred to as a first epipolar line L1. The intersection line of the plane and the second image plane I2 is referred to as a second epipolar line L2.

An epipolar equation is a basic equation in epipolar geometry. When vectors that represent the coordinate p1 and the coordinate p2 as homogeneous coordinates are m1 and m2, m1 and m2 are represented by Equation (1).

$$m1=(u1,v1,1)^T$$

$$m2=(u2,v2,1)^T \quad (1)$$

In this case, O1, O2, p1, and p2 are coplanar in a space coordinate system, so that the relation in Equation (2) is satisfied in a 3×3 matrix.

$$m2^T F m1 = 0 \Leftrightarrow (u2 \ v2 \ 1) \begin{pmatrix} F_{00} & F_{01} & F_{02} \\ F_{10} & F_{11} & F_{12} \\ F_{20} & F_{21} & F_{22} \end{pmatrix} \begin{pmatrix} u1 \\ v1 \\ 1 \end{pmatrix} = 0 \quad (2)$$

Equation (2) is referred to as an epipolar equation, and the matrix F is referred to as a fundamental matrix. The fundamental matrix F has nine components, but has seven degrees of freedom because of scale indetermination and because the fundamental matrix F is a regular matrix. The fundamental matrix is determined by solving Equation (2) in accordance with eight or more corresponding points, for example, in a known eight-point algorithm. An essential matrix is obtained on the basis of the fundamental matrix F, and a rotation matrix R and a translation vector t that represent the difference in attitude and position between the first camera and the second camera are obtained from the essential matrix.

Figure 3:
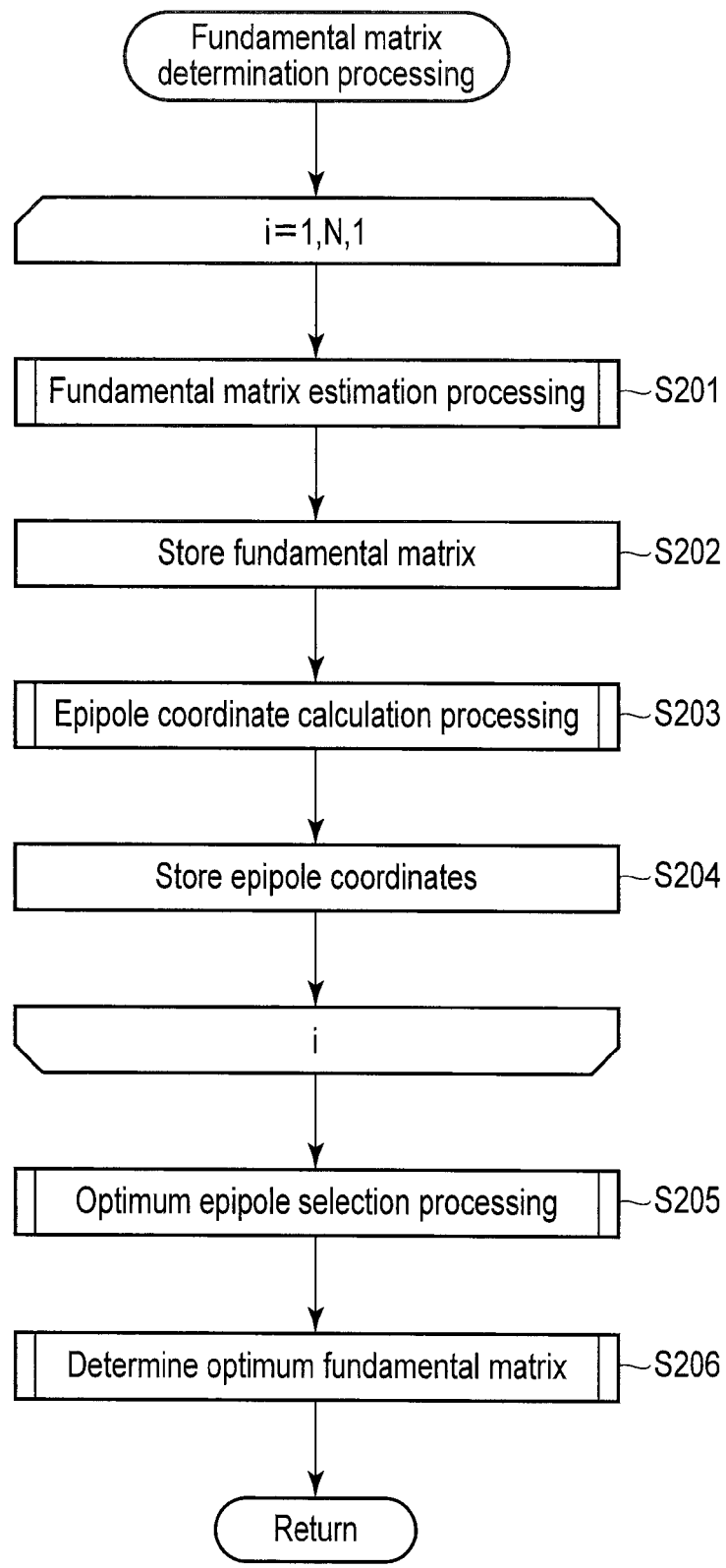
FIG. 3 is a flowchart showing an example of fundamental matrix determination processing according to the first embodiment.

Back to FIG. 3, the explanation continues. In step S201, the fundamental matrix estimation unit 120 of the image processing unit 100 performs fundamental matrix estimation processing. This processing is performed by, for example, a method that uses random sample consensus (RANSAC). The fundamental matrix estimation processing that uses RANSAC is described with reference to a flowchart shown in FIG. 5. In step S301, the fundamental matrix estimation unit 120 extracts a plurality of corresponding points at random from among the corresponding points acquired in the corresponding point acquisition processing by the corresponding point acquisition unit 110. For example, eight corresponding points are extracted in the present embodiment. In step S302, the fundamental matrix estimation unit 120 calculates the above-mentioned fundamental matrix F by using, for example, the known eight-point algorithm on the basis of the extracted eight corresponding points. The fundamental matrix calculated here is referred to as a temporary fundamental matrix.

In step S303, the fundamental matrix estimation unit 120 performs inlier number calculation processing. In the inlier number calculation processing, an epipolar geometry regarding two images is assumed. When the distance between an epipolar line obtained from the temporary fundamental matrix calculated in step S302 and each of the corresponding points acquired for each of the corresponding points in step S102 is smaller than a predetermined threshold, this corresponding point is an inlier (is highly evaluated). In the inlier number calculation processing, the number of corresponding points which are inliers among the corresponding points is obtained.

The inlier number calculation processing is described with reference to a flowchart shown in FIG. 6. In step S401, the fundamental matrix estimation unit 120 sets a variable I representing the number of inliers to 8. This is because the eight corresponding points used for the calculation of the temporary fundamental matrix are counted as inliers in the present embodiment.

The following processing is then performed for all the corresponding points. In step S402, the fundamental matrix estimation unit 120 calculates the distance between the epipolar line obtained from the temporary fundamental matrix and the target corresponding point. In step S403, the fundamental matrix estimation unit 120 determines whether the distance between the epipolar line and the corresponding point calculated in step S402 is less than (or is equal to or less than) a predetermined threshold. When determining that the distance is less than the threshold, the fundamental matrix estimation unit 120 increases the variable I representing the number of inliers by one in step S404. The corresponding point whose distance from the epipolar line is less than the predetermined threshold among the corresponding points is referred to as an inlier corresponding point. The processing then proceeds to step S405. When it is determined in step S403 that the distance is equal to or more than the predetermined threshold, the processing proceeds to step S405.

In step S405, the fundamental matrix estimation unit 120 determines whether the processing in step S402 to step S404 has been performed for all the corresponding points. When determining that the processing has not been performed, the processing returns to step S402, and similar processing is performed for the next corresponding point. When it is determined in step S405 that the processing has been performed, the processing determines the variable I as a return value and returns to the fundamental matrix estimation processing.

In this way, the number I of corresponding points which are inliers is calculated for the temporary fundamental matrix among all the corresponding points. Here, the temporary fundamental matrix having a larger number of inlier corresponding points can be said to be a fundamental matrix that more properly represents the relation between two images.

Figure 5:
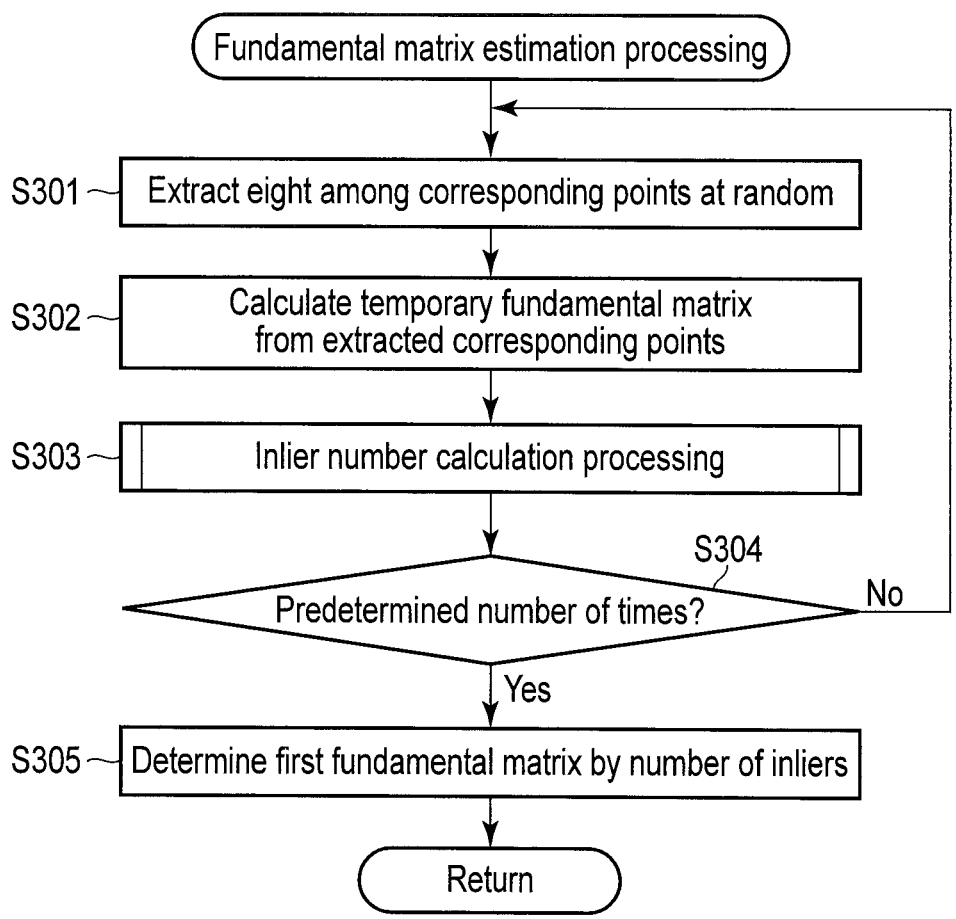
FIG. 5 is a flowchart showing an example of the fundamental matrix estimation processing according to the first embodiment.

Back to FIG. 5, the explanation continues. In step S304, the fundamental matrix estimation unit 120 determines whether the processing in step S301 to step S303 has been performed a predetermined number of times. When the processing has not been performed the predetermined number of times, the processing returns to step S301. When it is determined in step S304 that the processing has been performed the predetermined number of times, the processing then proceeds to step S305. In step S305, the fundamental matrix estimation unit 120 determines, as a first fundamental matrix, the temporary fundamental matrix having the largest number I of inlier corresponding points.

Here, the number of temporary fundamental matrices to calculate the number of inlier corresponding points according to the determination in step S304 is the predetermined number. However, this is not a limitation. The number of inlier corresponding points may be calculated for the temporary fundamental matrix until a predetermined termination condition is satisfied. After step S305, the processing determines the first fundamental matrix as a return value and returns to the fundamental matrix determination processing.

Back to FIG. 3, the explanation continues. In step S202, the fundamental matrix estimation unit 120 stores, in the storage unit 14, the first fundamental matrix obtained in the fundamental matrix estimation processing. In step S203, the epipole coordinate deriving unit 130 calculates epipole coordinates. The epipole coordinates are calculated in the following procedure.

A transposed matrix of the fundamental matrix F calculated by the fundamental matrix estimation unit 120 is $F^T$, the epipole coordinates of the first image represented in a homogeneous system is $e_1=(e1x,e1y,1)^T$, and the epipole coordinates of the second image represented in a homogeneous system is $e_2=(e2x,e2y,1)^T$. Here, Equation (3) is satisfied.

$$F^T e_1 = 0$$
$$F e_2 = 0 \quad (3)$$

Therefore, $e_1$ and $e_2$ can be obtained by solving simultaneous equations in Equation (3). For example, the matrix is subjected to singular value decomposition as in Equation (4):

$$FF^T = U_1 W_1 V_1^T$$
$$F^T F = U_2 W_2 V_2^T, \quad (4)$$

where $U_1$ and $U_2$ are referred to as left orthogonal matrices, $V_1$ and $V_2$ are referred to as right orthogonal matrices, and $W_1$ and $W_2$ are referred to as singular value matrices or diagonal matrices. $e_1$ and $e_2$ are obtained by Equation (5) on the basis of final column vector components of the right orthogonal matrices.

$$V_1 = \begin{pmatrix} v11 & v12 & v13 \\ v21 & v22 & v23 \\ v31 & v32 & v33 \end{pmatrix} \Rightarrow e_1 = \begin{pmatrix} e1x \\ e1y \\ 1 \end{pmatrix} = \begin{pmatrix} v13/v33 \\ v23/v33 \\ 1 \end{pmatrix} \quad (5)$$

$$V_2 = \begin{pmatrix} v11 & v12 & v13 \\ v21 & v22 & v23 \\ v31 & v32 & v33 \end{pmatrix} \Rightarrow e_2 = \begin{pmatrix} e2x \\ e2y \\ 1 \end{pmatrix} = \begin{pmatrix} v13/v33 \\ v23/v33 \\ 1 \end{pmatrix}$$

Thus, the epipole coordinates are calculated in step S203. In step S204, the epipole coordinate deriving unit 130 stores the calculated epipole coordinates in association with the used fundamental matrix in the storage unit 14.

The calculation of the first fundamental matrix using, for example, RANSAC by the fundamental matrix estimation unit 120 and the derivation of the epipole coordinates by the epipole coordinate deriving unit 130 based on the first fundamental matrix that have been described above are repeated N times. The processing then proceeds to step S205. In step S205, the epipole coordinate determination unit 140 performs optimum epipole selection processing. That is, the epipole coordinate determination unit 140 determines one optimum epipole for each image by use of a statistical technique from N or 2N epipole coordinates calculated by the epipole coordinate deriving unit 130. Here, the N epipole coordinates refer to epipole coordinates corresponding to each first fundamental matrix in one of the two images, and the 2N epipole coordinates refer to epipole coordinates corresponding to each first fundamental matrix in both of the two images. For example, in the present embodiment, an optimum epipole is determined by the use of a median. Therefore, as shown in FIG. 7, the epipole coordinate determination unit 140 has a median calculation unit 142, a distance calculation unit 146, and an epipole selection unit 148.

The optimum epipole selection processing is described with reference to a flowchart shown in FIG. 8. In step S501, the median calculation unit 142 in the epipole coordinate determination unit 140 reads coordinates of each epipole which are stored in the storage unit 14 by the repetition of the processing in step S201 to step S204, and determines a median of these epipole coordinates.

In step S502, the distance calculation unit 146 in the epipole coordinate determination unit 140 calculates a distance dEpi1 between the median calculated by the median calculation unit 142 in step S501 and the coordinates of each of the N or 2N epipoles. Here, when the 2N epipole coordinates are used, the distance dEpi1 is calculated, for example, in the following manner. A median of the epipole coordinates of the first image plane I1 is (Epi1_X_Mid,Epi1_Y_Mid), and a median of the epipole coordinates of the second image plane I2 is (Epi2_X_Mid,Epi2_Y_Mid). The coordinates of the i-th first epipole e1 determined in accordance with the first fundamental matrix are (Epi1_X(i),Epi1_Y(i)), and the coordinates of the second epipole e2 are (Epi2_X(i),Epi2_Y(i)). In this case, the distance dEpi1 is obtained by, for example, Equation (6).

$$dEpi1 = (Epi1\_X(i) - Epi1\_X\_Mid)^2 + (Epi1\_Y(i) - Epi1\_Y\_Mid)^2 + \quad (6)$$
$$(Epi2\_X(i) - Epi2\_X\_Mid)^2 + (Epi2\_Y(i) - Epi2\_Y\_Mid)^2$$

In step S503, the epipole selection unit 148 in the epipole coordinate determination unit 140 selects, as an optimum epipole coordinate, the epipole coordinate having the smallest distance dEpi1 calculated by the distance calculation unit 146. The processing determines the selected optimum epipole coordinates as a return value and returns to the fundamental matrix determination processing.

Although the optimum epipole is selected using the median of the epipole coordinates as a reference in the present embodiment, various statistics such as an average value may be used instead of the median. However, it is preferable to use the median to inhibit the influence of, for example, an outlier.

Back to FIG. 3, the explanation continues. In step S206, the fundamental matrix determination unit 150 reads, from the storage unit 14, a first fundamental matrix corresponding to the optimum epipole selected in the optimum epipole selection processing by the epipole coordinate determination unit 140, and determines this first fundamental matrix as an optimum fundamental matrix. This optimum fundamental matrix is referred to as a second fundamental matrix. The processing then determines the second fundamental matrix as a return value and returns to the processing described with reference to FIG. 2. The image processing unit 100 outputs the determined second fundamental matrix as an optimum fundamental matrix for the input image. This fundamental matrix may be stored in the storage unit 14.

Thus, for example, the image acquisition unit 12 functions as an image acquisition unit configured to acquire a plurality of images. For example, the corresponding point acquisition unit 110 functions as a corresponding point acquisition unit configured to acquire a plurality of first corresponding points that correspond to one another among the images. For example, the fundamental matrix estimation unit 120 functions as a first fundamental matrix estimation unit configured to calculate a plurality of first fundamental matrices on the basis of the first corresponding points. For example, the epipole coordinate deriving unit 130 functions as an epipole coordinate deriving unit configured to calculate, for at least one image, a plurality of first epipole coordinates that respectively correspond to the first fundamental matrices. For example, the epipole coordinate determination unit 140 functions as an epipole coordinate determination unit configured to determine one epipole coordinate as a second epipole coordinate among the first epipole coordinates by using a predetermined statistical technique. Here, for example, the optimum epipole coordinates are equivalent to the second epipole coordinates. For example, the fundamental matrix determination unit 150 functions as a fundamental matrix determination unit configured to determine the first fundamental matrix corresponding to the second epipole coordinate as a second fundamental matrix.

According to the present embodiment, the epipole coordinates are used to select a high-precision fundamental matrix from among the first fundamental matrices, so that a high-precision fundamental matrix can be output for the input images. Details are as follows: A robust technique such as RANSAC is used to calculate the first fundamental matrix, so that errors in the correspondence calculated in the corresponding point acquisition processing in step S102 and errors originating from a moving subject are excluded, and improvement of robustness is expected. However, when the subject is nearly a plane, that is, when the depth difference of the subject is small, the effect of excluding errors that can be caused by the formation of a state close to degeneracy in the calculation of the fundamental matrix is not expected in, for example, RANSAC. In contrast, according to the present embodiment, the epipole coordinates which serve as an index to indicate the attitude of the camera for acquiring the image are used to select the optimum value of the fundamental matrix by repetitive operations, so that the robustness for the planar subject can be improved.

In the present embodiment, the robustness for erroneous correspondence of corresponding points and for a dynamic subject is improved by a technique such as RANSAC, and the robustness for the planarity of the subject is improved by the computation that uses epipoles, so that the calculation of the fundamental matrix is considerably high in reliability as a whole.

In the example described above, RANSAC is used for the calculation of the first fundamental matrix. However, various robust estimating techniques can be used instead of RANSAC. For example, it is possible to use M-estimation, least median of square (LMedsS), and a technique derived from RANSAC, such as PROSAC. The present embodiment is advantageous to fundamental matrices calculated by various techniques.

In the example described above, step S201 to step S204 in the fundamental matrix determination processing are repeated the predetermined N times. However, when the error in the first fundamental matrix tends to be large, the number of times of repeating computations may be increased in order to improve robustness. The number of times of repeating the computations may be determined by, for example, at least one of imaging device information, scene determination information, motion vector information, and epipole coordinate distribution information. When the number of times of repetition is changed on the basis of such information, improvement in the precision of computational results is expected.

Here, the imaging device information is, for example, information on an imaging optical system used for imaging, and focal distance information, for example, can be used. That is, when a telescopic optical system having a long focal distance is used, the depth included in the subject tends to be smaller than the distance to the subject. Therefore, when the telescopic optical system is used, the subject is nearly a plane, and an error in the fundamental matrix to be calculated tends to be large. Thus, it is possible to set a relatively large number of times of repeating computations when the focal distance of the imaging optical system is long, whereas it is possible to set a relatively small number of times of repeating computations when the focal distance is short.

The scene determination information is automatic scene determination information for, for example, a "landscape" or a "person". When a scene is determined to be, for example, a "landscape", the depth tends to be smaller than the distance to the subject, so that the subject is nearly a plane, and an error tends to be large. Thus, it is possible to set a relatively large number of times of repeating computations when the scene is, for example, a "landscape".

The motion vector information can be, for example, the distribution and areas of corresponding points, or the distribution of calculated three-dimensional coordinates. When the distribution of the corresponding points is narrow, that is, when the area is small or when the distribution of the three-dimensional coordinates is nearly a plane, an error tends to be large. Thus, in this case, it is possible to set a relatively large number of times of repeating computations.

The epipole coordinate distribution information can be, for example, distribution information for the calculated epipoles. When the distribution of the epipoles is wide, the error in the fundamental matrix is determined to be large. Thus, in this case, it is possible to set a relatively large number of times of repeating computations.

Second Embodiment

A second embodiment of the present invention is described. Here, the difference between the first embodiment and the second embodiment is described, and the same parts are indicated by the same reference signs and are not described. According to the first embodiment, in the optimum epipole selection processing, an optimum epipole is selected by the use of the median of a plurality of epipoles calculated in accordance with a plurality of first fundamental matrices. In contrast, according to the present embodiment, a two-dimensional histogram is created regarding the coordinates of epipoles, and an optimum epipole is selected in accordance with this two-dimensional histogram.

Figure 10:
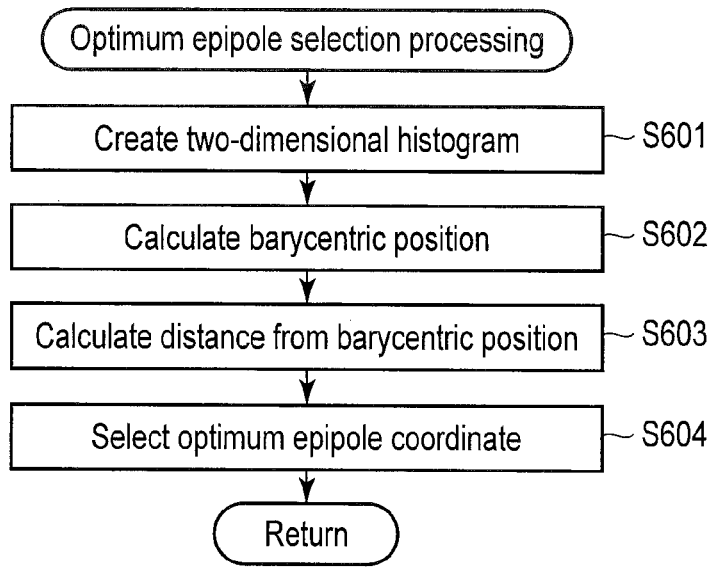
FIG. 10 is a flowchart showing an example of optimum epipole selection processing according to the second embodiment.

Thus, as shown in FIG. 9, the epipole coordinate determination unit 140 according to the present embodiment has a histogram creation unit 144, a barycentric position calculation unit 145, the distance calculation unit 146, and the epipole selection unit 148. Optimum epipole selection processing according to the present embodiment is described with reference to a flowchart shown in FIG. 10.

Figure 11:
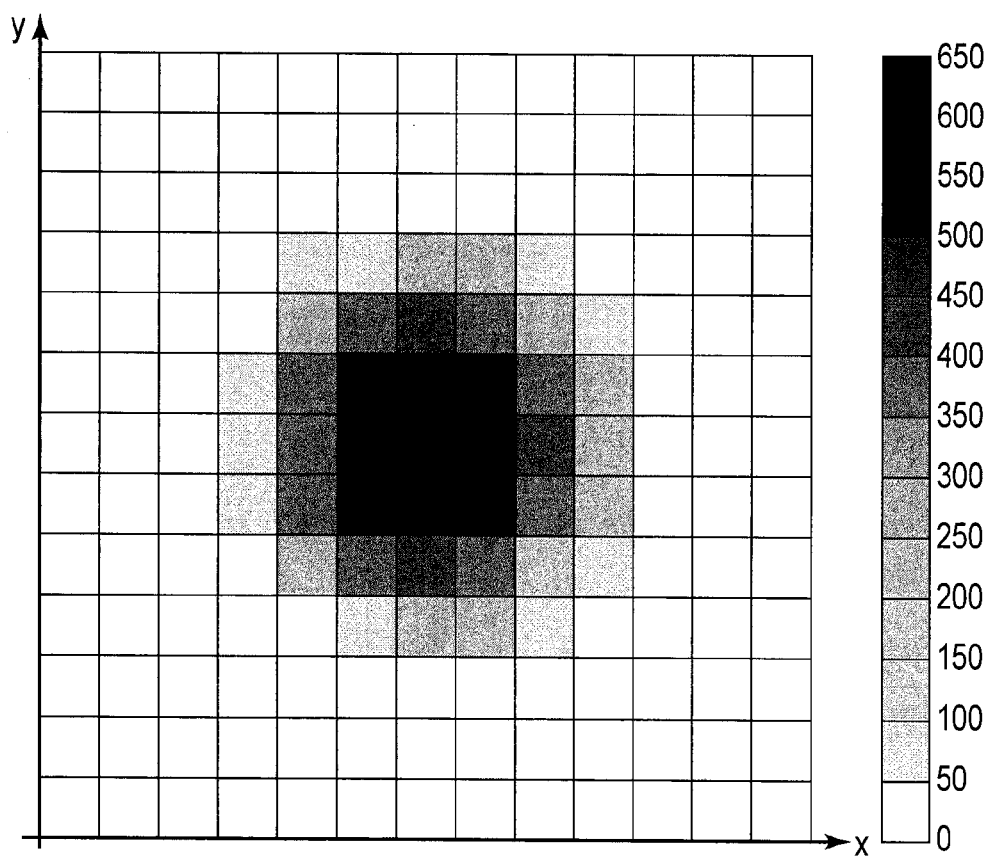
FIG. 11 shows an example of a histogram according to the second embodiment.

In step S601, the histogram creation unit 144 of the epipole coordinate determination unit 140 creates a two-dimensional histogram regarding epipole coordinates obtained for each of the first fundamental matrices by the processing in the epipole coordinate deriving unit 130. In step S601, for example, a histogram shown in FIG. 11 is created. This histogram is created, for example, in the following procedure. First, barycentric positions and standard deviations are calculated for N epipole coordinates in an X-direction and a Y-direction. The center and bin width of the histogram are then determined on the basis of the barycentric positions and the standard deviations in the X-direction and the Y-direction. A vote is taken for the N epipole coordinates, and a two-dimensional histogram is created.

In step S602, the barycentric position calculation unit 145 of the epipole coordinate determination unit 140 calculates the barycentric position of the epipole coordinates in a region indicating a mode, on the basis of the histogram created by the histogram creation unit 144 in step S601. The barycenter is determined, for example, in the following procedure. First, a region indicating the mode of the two-dimensional histogram is determined. The barycentric position of the epipole coordinates in the region indicating the mode is then determined. The calculation of the barycentric position may not only include the region indicating the mode but also include regions around the above region.

In step S603, the distance calculation unit 146 of the epipole coordinate determination unit 140 calculates a distance dEpi2 between the barycentric position calculated by the barycentric position calculation unit 145 in step S602 and the coordinates of each of the N or 2N epipoles. The distance dEpi2 is calculated, for example, in the following manner. The epipole coordinate barycenter of a first image is (Epi1_X_Ave,Epi1_Y_Ave), and the epipole coordinate barycenter of a second image is (Epi2_X_Ave,Epi2_Y_Ave). The coordinates of the i-th first epipole determined in accordance with the first fundamental matrix are (Epi1_X(i), Epi1_Y(i)), and the coordinates of the second epipole are (Epi2_X(i),Epi2_Y(i)). In this case, the distance dEpi2 is obtained by, for example, Equation (7).

$$dEpi2 = (Epi1\_X(i) - Epi1\_X\_Ave)^2 + (Epi1\_Y(i) - Epi1\_Y\_Ave)^2 + \quad (7)$$
$$(Epi2\_X(i) - Epi2\_X\_Ave)^2 + (Epi2\_Y(i) - Epi2\_Y\_Ave)^2$$

In step S604, the epipole selection unit 148 in the epipole coordinate determination unit 140 selects, as an optimum epipole coordinate, the epipole coordinate having the smallest distance dEpi2 calculated by the distance calculation unit 146 in step S603. The processing determines the selected optimum epipole as a return value and returns to the fundamental matrix determination processing.

In step S206 of the fundamental matrix determination processing, the fundamental matrix determination unit 150 reads a first fundamental matrix corresponding to the optimum epipole from the storage unit 14, and determines this first fundamental matrix as a second fundamental matrix which is an optimum fundamental matrix. The processing then returns to the processing described with reference to FIG. 2. The image processing unit 100 outputs the determined second fundamental matrix as a fundamental matrix for the input image.

According to the present embodiment as well, advantageous effects similar to those according to the first embodiment are obtained by the use of the epipole coordinates.

Third Embodiment

A third embodiment of the present invention is described. Here, the difference between the third embodiment and the first and second embodiments is described, and the same parts are indicated by the same reference signs and are not described. The image processing apparatuses 10 according to the first embodiment and the second embodiment are apparatuses which output a fundamental matrix when a plurality of images are input. In contrast, the image processing apparatus 10 according to the present embodiment is an apparatus which calculates a fundamental matrix when a plurality of images are input, and outputs three-dimensional coordinates corresponding to the input images obtained on the basis of the fundamental matrix.

A schematic configuration example of the image processing apparatus 10 according to the present embodiment is shown in FIG. 12. As shown in FIG. 12, the image processing unit 100 of the image processing apparatus 10 further comprises a motion estimation unit 160 and a three-dimensional coordinate estimation unit 170 subsequent to the fundamental matrix determination unit 150, as compared with the first embodiment. The motion estimation unit 160 calculates the difference in attitude and position of the camera which has taken the input images, that is, calculates the motion of the camera. The three-dimensional coordinate estimation unit 170 calculates three-dimensional coordinates of the corresponding points of the input image on the basis of the motions of the cameras calculated in the motion estimation unit 160.

Figure 13:
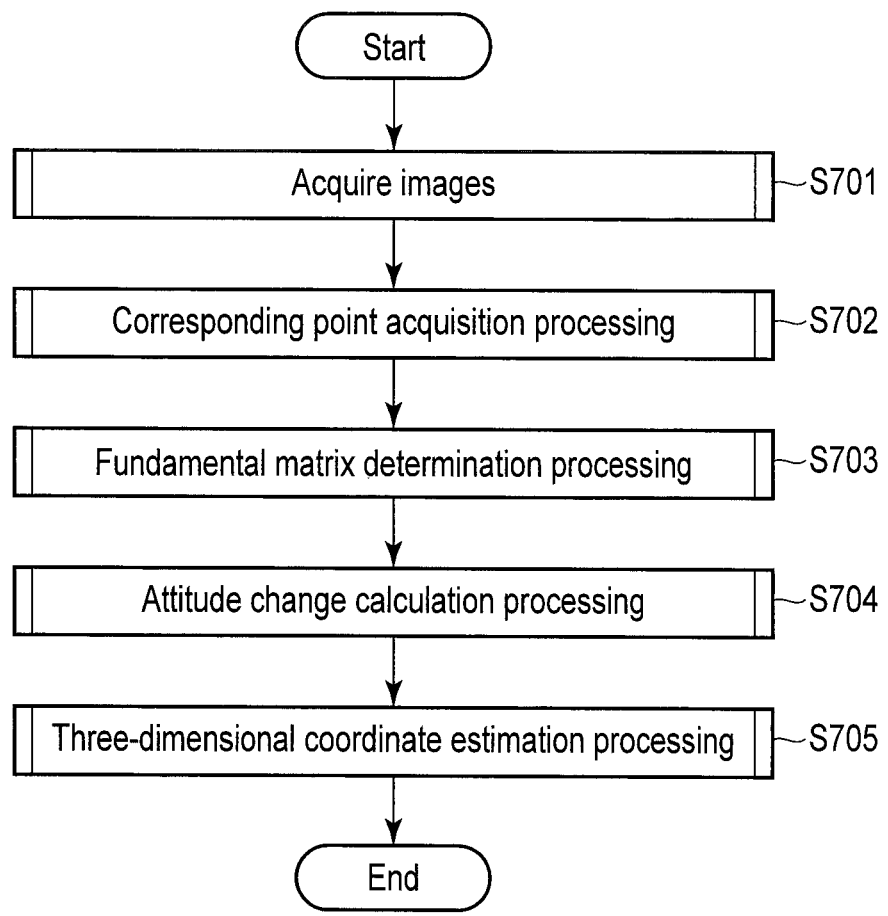
FIG. 13 is a flowchart showing an example of processing by the image processing apparatus according to the third embodiment.

The image processing according to the present embodiment is described with reference to a flowchart shown in FIG. 13. In step S701, the image acquisition unit 12 acquires, for example, two images. In step S702, the corresponding point acquisition unit 110 acquires corresponding points of the input two images, as in step S102 according to the first embodiment. In step S703, the fundamental matrix estimation unit 120, the epipole coordinate deriving unit 130, the epipole coordinate determination unit 140, and the fundamental matrix determination unit 150 perform fundamental matrix determination processing and determine a fundamental matrix as in step S103 according to the first embodiment.

In step S704, the motion estimation unit 160 calculates the difference in position and attitude of the camera, that is, the difference between position and attitude of the camera which has taken one input image and those of the camera which has taken the other input image, on the basis of the fundamental matrix calculated by the fundamental matrix determination processing. For example, the motion estimation unit. 160 calculates an essential matrix on the basis of the fundamental matrix, and calculates a rotation matrix and a translation vector on the basis of the essential matrix. The rotation matrix and the translation vector represent the rotation and translation, that is, the motion of the camera. In the present embodiment, the rotation and translation may be output by the image processing apparatus 10, or may be stored in the storage unit 14.

In step S705, the three-dimensional coordinate estimation unit 170 estimates three-dimensional coordinates for the corresponding points of the input two images by a known method on the basis of the calculated positional relation of the camera. The estimated three-dimensional coordinate information is output by the image processing apparatus 10. This three-dimensional information may be stored in the storage unit 14.

According to the present embodiment, a high-precision fundamental matrix is calculated and is used for three-dimensional estimation, so that high-precision three-dimensional estimation can be performed.

The technique that uses a histogram may be used in the present embodiment as well as in the second embodiment, in which case similar functions and advantageous effects are also provided.

Fourth Embodiment

Figure 14:
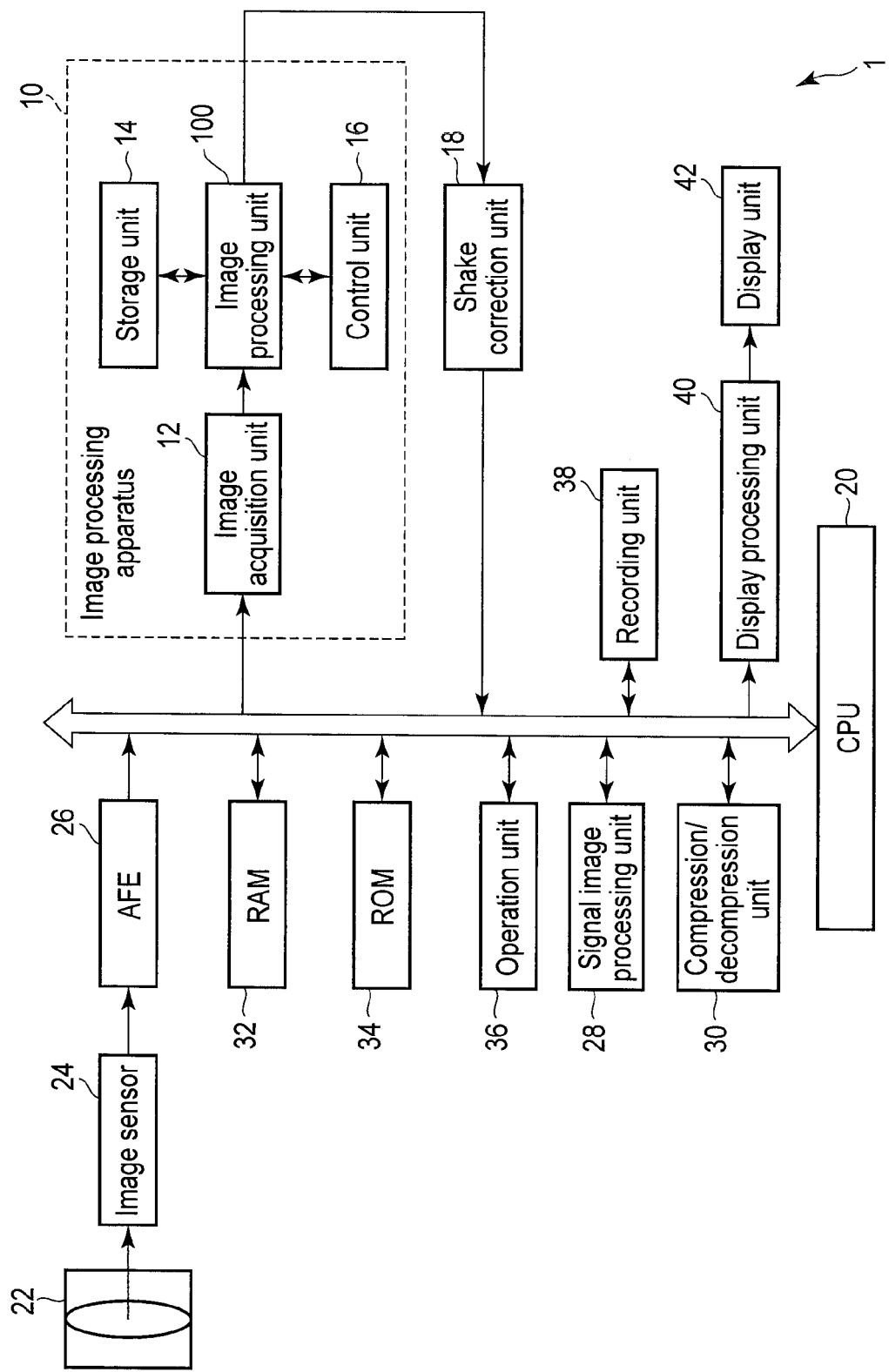
FIG. 14 is a block diagram showing a configuration example of a digital camera according to a fourth embodiment.

A fourth embodiment is described. Here, the difference between the fourth embodiment and the first and second embodiments is described, and the same parts are indicated by the same reference signs and are not described. The present embodiment relates to a digital camera 1 comprising the image processing apparatus 10 according to the first embodiment or the second embodiment. A configuration example of the digital camera 1 according to the present embodiment is shown in FIG. 14. The digital camera 1 comprises the image processing apparatus 10 and a shake correction unit 18. The digital camera 1 also comprises a CPU 20, an imaging optical system 22, an image sensor 24, an analog front end (AFE) 26, a signal image processing unit 28, a compression/decompression unit 30, a random access memory (RAM) 32, a read only memory (ROM) 34, an operation unit 36, a recording unit 38, a display processing unit 40, and a display unit 42.

The CPU 20 functions as a controller, and controls each component of the digital camera 1. The imaging optical system 22 includes lenses and a diaphragm, and forms a subject image on the image sensor 24. The image sensor 24 converts the subject image formed by the imaging optical system 22 into electric signals. The AFE 26 performs analog signal processing such as correlated double sampling, analog gain control, and A/D conversion. The signal image processing unit 28 subjects the digital image signals output from the AFE 26 to image processing such as color separation, white balance, and gamma conversion. The compression/decompression unit 30 compresses or decompresses the image. The RAM 32 serves for temporary storage necessary for various processes and computations. Various programs and others necessary for the control and compurgation in the digital camera 1 are stored in the ROM 34. The operation unit 36 receives the input of an instruction from a user regarding the operation of the digital camera 1. The recording unit 38 is removably connected to, for example, the digital camera 1, and images acquired by the digital camera 1 are recorded in the recording unit 38. The display processing unit 40 performs image processing for display on the display unit 42. The display unit 42 includes, for example, a liquid crystal display, and displays the image processed in the display processing unit 40.

The image signals of the subject which has come into the image sensor 24 via the imaging optical system 22 and then converted to the electric signals are subjected to image processing in the AFE 26 and the signal image processing unit 28. These image-processed signals are sequentially input to the image processing apparatus 10 as moving images. The image processing apparatus 10 sequentially performs the processing to calculate a fundamental matrix described in the first embodiment between the image of one frame of the input moving images and the image of the next frame.

The shake correction unit 18 acquires the fundamental matrix output by the image processing apparatus 10, and performs the processing to remove a shake between the frames of the input moving images on the basis of the fundamental matrix. That is, the shake correction unit 18 calculates an essential matrix on the basis of the fundamental matrix. A generally known technique is used to calculate the essential matrix from the fundamental matrix. The shake correction unit 18 calculates a rotation matrix and a translation vector on the basis of the calculated essential matrix. Here, the rotation matrix and the translation vector represent the difference between the position and attitude of the camera which has acquired the image of one frame and the position and attitude of the camera which has acquired the image of the next frame. That is, the rotation matrix and the translation vector represent the shake amount of the cameras which have acquired the images between the frames.

The shake correction unit 18 calculates a shake correction amount on the basis of the calculated rotation matrix and the translation vector. That is, the shake correction unit 18 calculates a proper image correction amount to offset the shake of the cameras caused between the frames obtained as the rotation matrix and the translation vector. In this case, a low pass filter, for example, is used to determine the correction amount to make a smooth correction rather than a rapid correction. The shake correction unit 18 performs image conversion on the basis of the calculated correction amount, and removes the shake in the images. In this way, an image without the shake caused between the frames is created by the shake correction unit 18. A signal of the image without the shake is displayed on the display unit 42 via the display processing unit 40. The image signal without the shake is also recorded in the recording unit 38.

According to the present embodiment, the shake is removed by the image processing apparatus 10 and the shake correction unit 18. Therefore, the shake in the image caused by the hand motion of the user who operates the digital camera 1 is removed, and the image recorded in the recording unit 38 and the image displayed on the display unit 42 are higher in quality than the image acquired by a camera without the image processing apparatus 10.

In the present embodiment as well as in the second embodiment, the processing that uses a histogram may be performed in the image processing apparatus 10. In this case, similar functions and advantageous effects are also provided. The image processing apparatus 10 may be configured to calculate three-dimensional coordinates as in the third embodiment so that the digital camera 1 outputs a three-dimensional reconstructed image of the photographed subject.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
an image acquisition unit configured to acquire a plurality of images;
a corresponding point acquisition unit configured to acquire a plurality of first corresponding points that correspond to each other between the images;
a first fundamental matrix estimation unit configured to calculate a plurality of first fundamental matrices based on the first corresponding points;
an epipole coordinate deriving unit configured to calculate, for at least one image, a plurality of first epipole coordinates that respectively correspond to the first fundamental matrices;
an epipole coordinate determination unit configured to determine one of the first epipole coordinates as a second epipole coordinate by using a predetermined statistical technique; and
a fundamental matrix determination unit configured to determine the first fundamental matrix corresponding to the second epipole coordinate as a second fundamental matrix.

2. The image processing apparatus according to claim 1, wherein the epipole coordinate determination unit comprises:
a median calculation unit configured to calculate a median of the first epipole coordinates;
a distance calculation unit configured to calculate distances between each of the first epipole coordinates and the median; and
an epipole selection unit configured to determine the first epipole coordinate having the smallest distance as the second epipole coordinate among the first epipole coordinates.

3. The image processing apparatus according to claim 1, wherein the epipole coordinate determination unit comprises:
a histogram creation unit configured to count a frequency of the first epipole coordinates;

a barycentric position calculation unit configured to determine a barycentric position of a region having a high frequency;

a distance calculation unit configured to calculate distances between each of the first epipole coordinates and the barycentric position; and an epipole selection unit configured to determine one of the first epipole coordinates having the smallest distance as the second epipole coordinate among the first epipole coordinates.

4. The image processing apparatus according to claim 1, further comprising:

a motion estimation unit configured to estimate a difference in position and attitude between cameras which have taken the images; and a three-dimensional coordinate estimation unit configured to estimate three-dimensional coordinates of a subject included in the images based on the difference in position and attitude.

5. The image processing apparatus according to claim 1, wherein a number of the first fundamental matrices is determined based on at least one of imaging device information, scene determination information, motion vector information, and epipole coordinate distribution information.

6. An imaging device comprising:

an imaging unit configured to form images;

an image acquisition unit configured to acquire the images formed at different time;

a corresponding point acquisition unit configured to acquire a plurality of first corresponding points that correspond to each other between the images;

a first fundamental matrix estimation unit configured to calculate a plurality of first fundamental matrices based on the first corresponding points;

an epipole coordinate deriving unit configured to calculate, for at least one image, a plurality of first epipole coordinates that respectively correspond to the first fundamental matrices;

an epipole coordinate determination unit configured to determine one of the first epipole coordinates as a second epipole coordinate by using a predetermined statistical technique;

a fundamental matrix determination unit configured to determine the first fundamental matrix corresponding to the second epipole coordinate as a second fundamental matrix; and a correction unit configured to correct a shake between the images based on the second fundamental matrix.

7. An image processing method comprising:

acquiring a plurality of images;

acquiring a plurality of first corresponding points that correspond to each other between the images;

calculating a plurality of first fundamental matrices based on the first corresponding points;

calculating, for at least one image, a plurality of first epipole coordinates that respectively correspond to the first fundamental matrices;

determining one of the first epipole coordinates as a second epipole coordinate by using a predetermined statistical technique; and determining the first fundamental matrix corresponding to the second epipole coordinate as a second fundamental matrix.

8. A non-transitory computer-readable storage medium recording a program which causes a computer to:

acquire a plurality of images;

acquire a plurality of first corresponding points that correspond to each other between the images;

calculate a plurality of first fundamental matrices based on the first corresponding points;

calculate, for at least one image, a plurality of first epipole coordinates that respectively correspond to the first fundamental matrices;

determine one of the first epipole coordinates as a second epipole coordinate by using a predetermined statistical technique; and determine the first fundamental matrix corresponding to the second epipole coordinate as a second fundamental matrix.

* * * * *